March 20, 1934.    E. SCHAAD    1,951,995

BALANCE WHEEL FOR WATCHES AND OTHER HOROLOGICAL INSTRUMENTS

Filed Dec. 7, 1932

Witness:
Arthur Thompson

Inventor:
Ernest Schaad

Patented Mar. 20, 1934

1,951,995

UNITED STATES PATENT OFFICE 1,951,995

BALANCE-WHEEL FOR WATCHES AND OTHER HOROLOGICAL INSTRUMENTS

Ernest Schaad, Johannesburg, Transvaal, Union of South Africa

Application December 7, 1932, Serial No. 646,091
In Union of South Africa December 12, 1931

3 Claims. (Cl. 58—107)

This invention has reference to balance-wheels as used in watches and other similar horological instruments.

The invention appertains in particular to balance-wheels in which an elastic or resilient connection is interposed between the rim and the centre of the balance-wheel for the purpose of preventing disorganization of the balance-wheel mounting and pivots due to violent shocks.

In certain balance-wheels of the kind referred to, the resilient medium has been connected to the rim of the wheel at two diametrically opposite points, and to the hub also at two diametrically opposite points; and said resilient connecting medium has been constructed in the form of bent spring spokes fashioned integral with the rim and hub of the wheel.

Now the object of the present invention is to simplify and improve the construction of such resilient connecting means or medium, to render the shock-absorbing property more sensitive by positioning the resilient medium around and in close proximity to the balance-wheel staff, to facilitate the production and assembly of the parts of the balance-wheel, and to embody the features of the invention in a strong and durable construction.

This construction aims at the concentration and absorption of the shock about the centre of the wheel, and obviates the transmission of the same from the relatively heavy rim of the balance-wheel to the balance-wheel pivots.

According to my invention the balance-wheel comprises a rim or outer portion rigidly connected to an apertured inner portion, in which latter is arranged and to which is connected a resilient suspension means or medium; the suspension means or medium being adapted to be mounted upon and fixed to the balance-wheel staff.

In a practical embodiment, the balance-wheel, which may be of any ordinary construction and, if desired, be compensating, includes an outer rim portion and a concentric hub portion rigidly connected by means of two or more spokes to said outer rim portion. The hub portion constitutes a housing for the reception of a ring, to one point on the inside of which the resilient or spring medium is connected; the resilient or spring medium being of substantially circular form and connected at the other end to a centre piece which is mounted on the balance-wheel staff and forms the spring supporting or suspension means for the entire balance-wheel structure.

Figure 1:
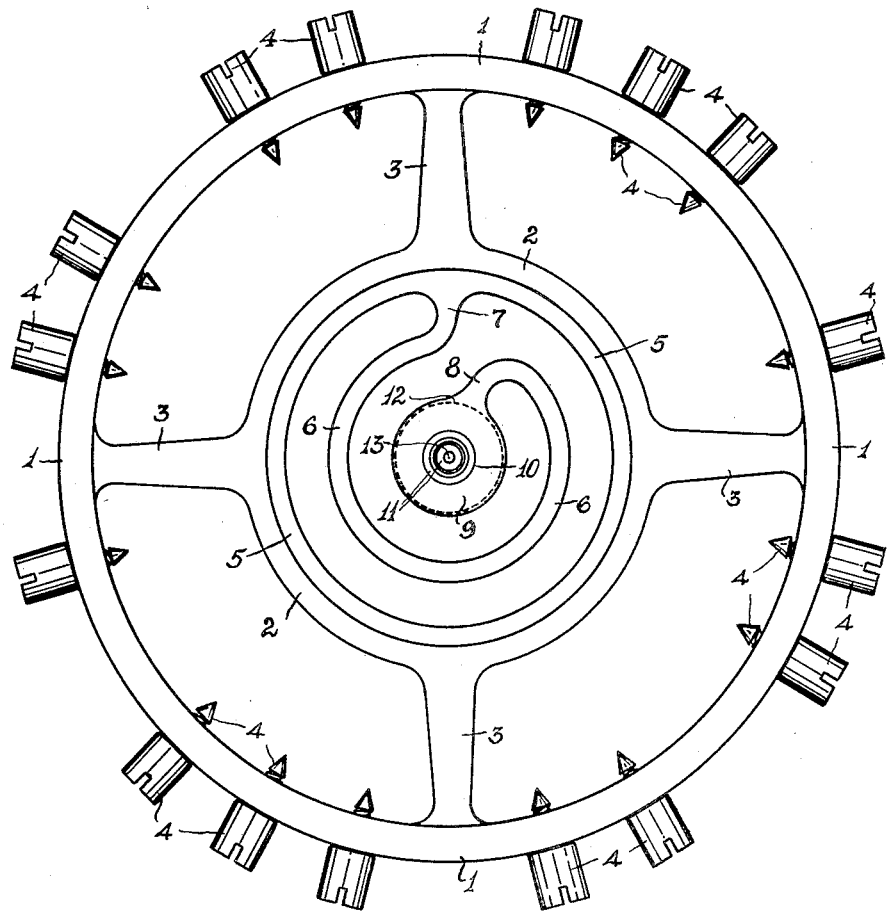
Figure 2:
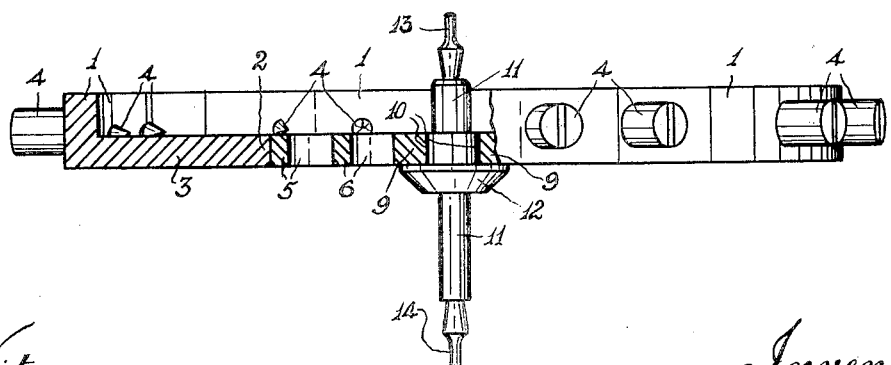

In the accompanying drawing I illustrate one form of the invention, drawn to an enlarged scale, wherein Fig. 1 is a plan view of the complete balance-wheel and balance-wheel staff, and Fig. 2 is a part-sectional elevation of the same.

In the drawing the numeral 1 denotes the rim portion of the balance-wheel, and 2 is the inner concentric ring or hub which is rigidly connected to the rim portion 1 by the spokes 3. In the form shown the hub portion 2 is connected to the rim portion 1 by four of the spokes 3 placed in diametrically opposed pairs. It is, however, to be understood that the parts 1, 2, may be rigidly connected together by two or any other suitable number of the spokes 3, or otherwise.

The balance-wheel is shown provided in the rim 1 with an arrangement of timing and adjusting screws 4, but these may be dispensed with if not required.

Although the rim portion 1 is shown as a continuous or solid ring, the invention can be adopted in the construction of ordinary compensating balance-wheels.

Within the concentric inner or hub portion 2 of the balance-wheel there is arranged the tight-fitting concentric ring 5. This ring 5 provides the space in which is operatively positioned the resilient or spring suspension means of the balance-wheel. This means, in the form shown, includes the substantially circular resilient or spring member 6, shown connected at one end 7 to the ring 5, and at the other end 8 fashioned in one piece with the annular centre piece 9. For convenience in manufacture, the resilient or spring member 6 may, as shown in the drawing, be fashioned or constructed integral or in one piece with the ring 5.

The aperture 10 in the centre piece 9 forms the opening in which fits the balance-wheel staff 11, so that the centre piece 9 rests upon and is supported by the bevelled flange 12 provided for that purpose on the staff 11. 13, 14, represent the pivots of the staff 11.

The resilient or spring member 6 is preferably of highly tempered steel so as to ensure sufficient resiliency in it to absorb abnormal or violent shocks and to allow the rim portion 1 to vibrate or move out of the plane of its normal oscillating movement to an adequate extent to obviate the transmission of such shocks to the balance-wheel staff pivots 13, 14.

In the embodiment of the invention illustrated in the drawing the spring suspension member 6 is shown of substantially circular formation, but it is to be understood that it may be made of spiral, involute, or any other preferred and suitable shape.

What I claim as my invention and desire to protect by Letters Patent is:—

1. A balance-wheel for watches and other horological instruments, including a rim portion, an inner concentric portion rigidly connected to said rim portion, a concentric ring arranged in and tightly fitting the inner concentric portion, a resilient medium arranged in the ring and connected at one end thereto, and a centre piece having a central opening for the balance staff, to which centre piece the other end of the resilient medium is connected, as set forth.

2. A balance-wheel for watches and other horological instruments, including a rim portion, a concentric hub portion, spokes rigidly connecting said hub portion to the rim portion, a concentric ring arranged in and tightly fitting the hub portion, a resilient medium arranged in the ring and connected at one end thereto, and a centre piece having a central opening for the balance staff, to which centre piece the other end of the resilient medium is connected, as set forth.

3. A balance-wheel for watches and other horological instruments, including a rim portion, a concentric hub portion, spokes rigidly connecting said hub portion to the rim portion, a concentric ring arranged in and tightly fitting the hub portion, a resilient suspension medium arranged in the ring, and a centre piece having a central opening for the balance staff, by which centre piece the balance-wheel is mounted on and fixed to the balance staff, the resilient suspension medium being in the form of a substantially circular spring piece attached at one end to the ring and at the other end to the centre piece, as set forth.

ERNEST SCHAAD.